Sept. 4, 1962     A. CARFAGNA     3,052,475
MECHANICAL SEALS FOR THE STUFFING BOXES OF ROTARY MACHINES
Filed Jan. 27, 1959     2 Sheets-Sheet 1
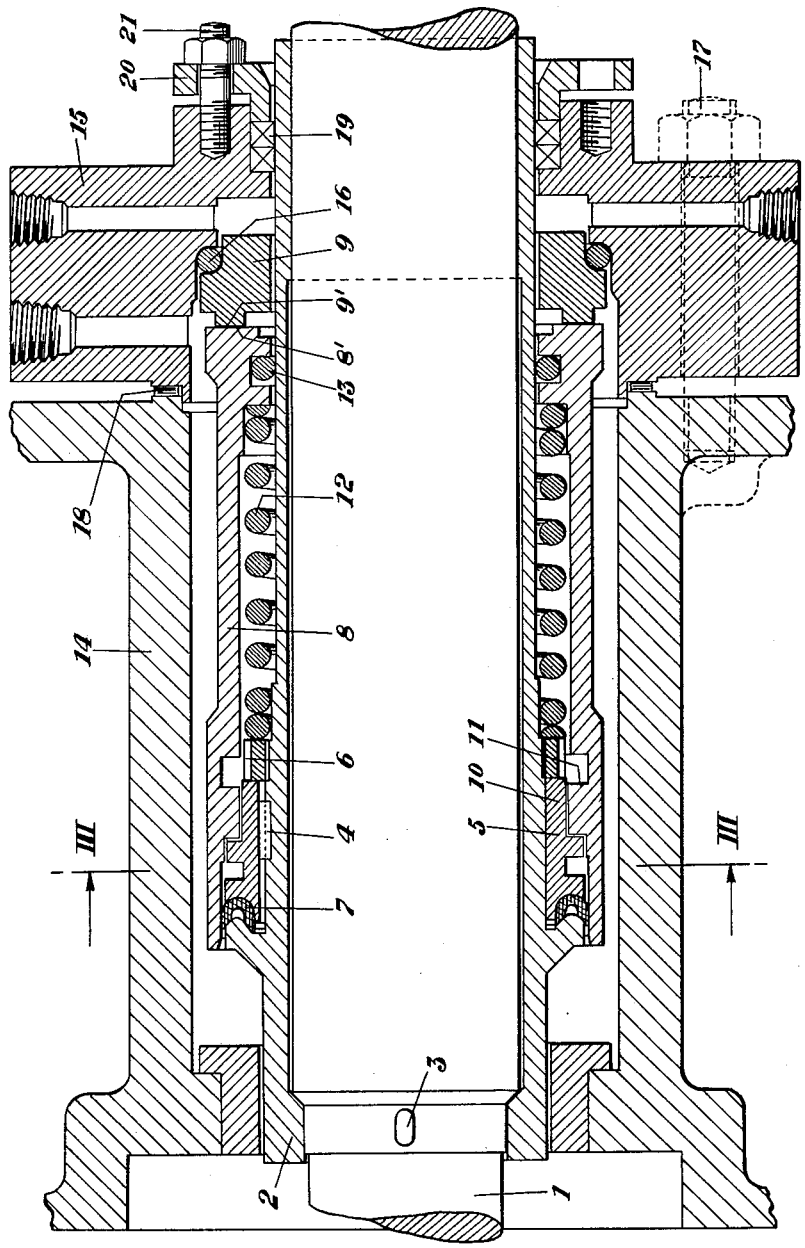
FIG.I.
INVENTOR:
Armando CARFAGNA
BY:
Wenderoth, Lind + Ponack
Attys Sept. 4, 1962  A. CARFAGNA  3,052,475
MECHANICAL SEALS FOR THE STUFFING BOXES OF ROTARY MACHINES
Filed Jan. 27, 1959  2 Sheets-Sheet 2

INVENTOR
Armando Carfagna
by Wenderoth, Lind and Ponack
Attorneys

United States Patent Office 3,052,475
Patented Sept. 4, 1962

3,052,475
MECHANICAL SEALS FOR THE STUFFING BOXES OF ROTARY MACHINES
Armando Carfagna, 290A Via A. Falcone, Naples, Italy
Filed Jan. 27, 1959, Ser. No. 789,359
Claims priority, application Italy Feb. 3, 1958
3 Claims. (Cl. 277—93)

The present invention relates to devices, known as mechanical seals, which are mounted within the stuffing boxes of the rotary machines, for instance centrifugal pumps, in lieu of the usual packings, to provide fluid tightness for more or less corrosive and hot pressurized fluids.

The object of the present invention is to improve such mechanical seals in order to make them more adequate for the increasingly rigorous applications demanded by the industry, and particularly the chemical and petroleum industry.

The object of the present invention is accomplished by providing means for mechanically balancing the rotating seal element so that, should the frictional resistance between the sealing faces of the seal tend to increase, the pressure with which the sealing faces press against each other will be reduced, while if such pressure should increase, the frictional resistance will be reduced.

The seal structure of the present invention, both the spring and the driving connection for the rotating seal element are out of contact with the fluid, and therefore their effectiveness, upon which depends to a great extent the efficiency of the seal, is in no way negatively affected by the action of the fluid, not even by a slight leakage through the seals.

A single preferred embodiment of this invention is presented in the accompanying drawings for purpose of illustration, without, however limiting the invention to that particular embodiment.

In the drawings:

FIGURE 1 is a longitudinal section of a preferred embodiment of a mechanical seal according to the invention, mounted in the stuffing box of a centrifugal pump.

With reference to the drawings:

Figure 3:
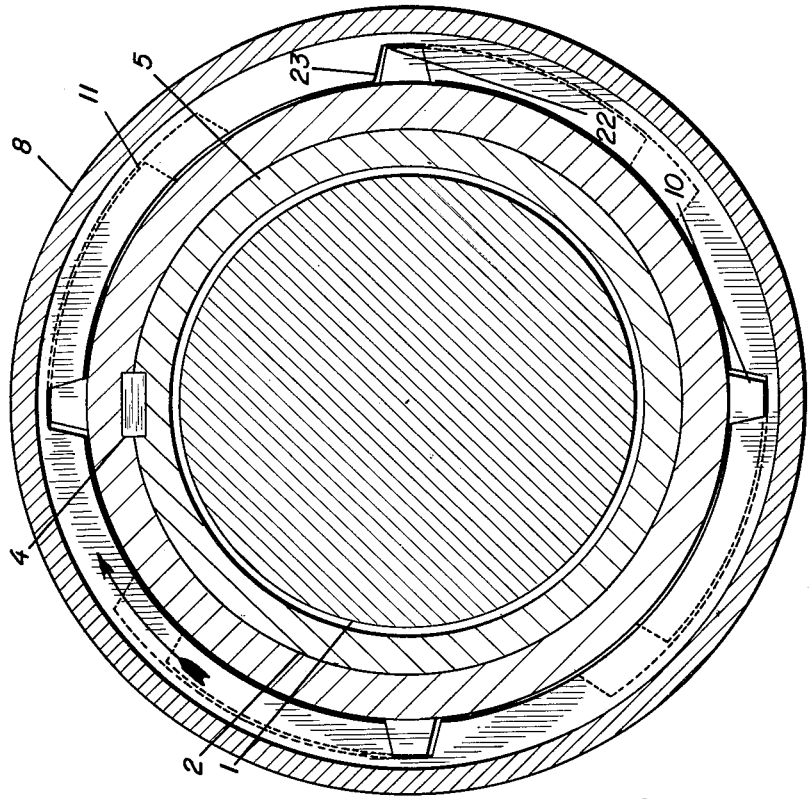
FIG. 3 is a cross section taken along line III—III of FIG. 1.

The shaft sleeve 2 is keyed to the shaft 1 of the pump (not shown in the drawing) by means of the key 3. Said shaft sleeve 2 is sealingly fixed on the shaft 1 and is locked by the hub of the impeller, by means of the locking nut of the latter (not shown in the drawing). On the shaft sleeve 2 is keyed, by means of the key 4, the drive bushing 5. The latter, by means of the screw threaded nut 6, also provides a way of tightening the inner sealing ring 7 which is suitably sealingly clamped between said drive bushing 5 and the suitable shoulder provided on the shaft sleeve 2. The inner sealing ring 7 is to be, of course, of the most suitable type, as to its shape, size and material. Also, said sealing ring 7 is arranged in the most suitable way to provide an effective seal between the shaft sleeve 2 and the rotating seal element 8, leaving meanwhile to the latter a sufficient freedom of radial and axial movement so as to permit the rotating seal face 8' to be always perfectly seated against the sealing face 9' of the stationary element 9.

The outer surface of the drive bushing 5 is provided with a plurality of helical teeth 10 which are suitably inclined with respect to the axis of the shaft. Said helical teeth 10 are engaged by the corresponding teeth 11 which are provided on the inner surface of the rotating seal element 8 at the end opposite to that on which is positioned the sealing surface 8'.

Said teeth 10 forming the driving member, and the teeth 11 forming the driven member, are prevented from any contact with the fluid, in that they are located beyond the inner sealing ring 7, the purpose of which is to provide a perfectly tight seal. The same conditions prevail also for the other members located inside the rotating element 8, i.e. the spring 12 and the outer sealing ring 13. This outer sealing ring, having the most suitable features as to its type, shape and material, forms a second seal on the shaft sleeve 2. The spring 12 consists of one single element, or of a plurality of elements, having small dimensions and peripherally arranged around sleeve 2.

A suitable seal face 8' is provided at the end of the rotating element 8, and is located in a plane at right angles to the axis of rotation of shaft 1, and said seal face forms the seal by slidably abutting the seal face 9' of the stationary element 9. The latter is positioned within a suitable recess provided in the outer body 15, with respect to which said element 9 is prevented from rotating, being locked by a suitable locking pin or other similar member (not shown). The seal between the outer body 15 and the stationary element 9 is formed by the special seat ring 16 which is of the most suitable type to carry out said seal, and in the said seat ring also acts as flexible member. The outer body 15 is locked to the stuffing box 14 by means of the bolts 17 and the seal is ensured by means of the gasket 18. The outer body 15 is provided with the suitable openings for a cooling fluid; further, an auxiliary stuffing box is provided in said body and in said auxiliary stuffing box are located the packings 19 which can be tightened by the gland 20, by means of the bolts 21.

The helical teeth 10 on the outer surface of the drive bushing 5 may be formed e.g. by four teeth projecting from the said surface and extending in the direction of a cylindrical spiral around the rotating axis. On the inner surface of the rotating sealing element 8 at the end opposite to that which carries the sealing surface 8' there are provided four helical grooves which are positioned to receive the teeth 10. The said helical grooves define four teeth which form the helical teeth 11. The rotating sealing element 8 is rotated by the drive bushing 5 by means of the four teeth 10 the flanks 23 of which press against the flanks 22 of the teeth 11. If the drive bushing rotates clockwise, looking towards the sealing surfaces 8' and 9' (arrow FIG. 3), the inclination of the teeth 10 and 11 on the rotation axis is such that the force P exerted by flanks 23 of the teeth 10 on the flanks 22 of teeth 11 has a tangential component F and an axial component S which is proportional to the first component depending on the tangent of the inclination angle of the teeth and is directed in the sense so as to reduce the coupling load between the rotating surface 8' and the stationary surface 9'.

Figure 2:
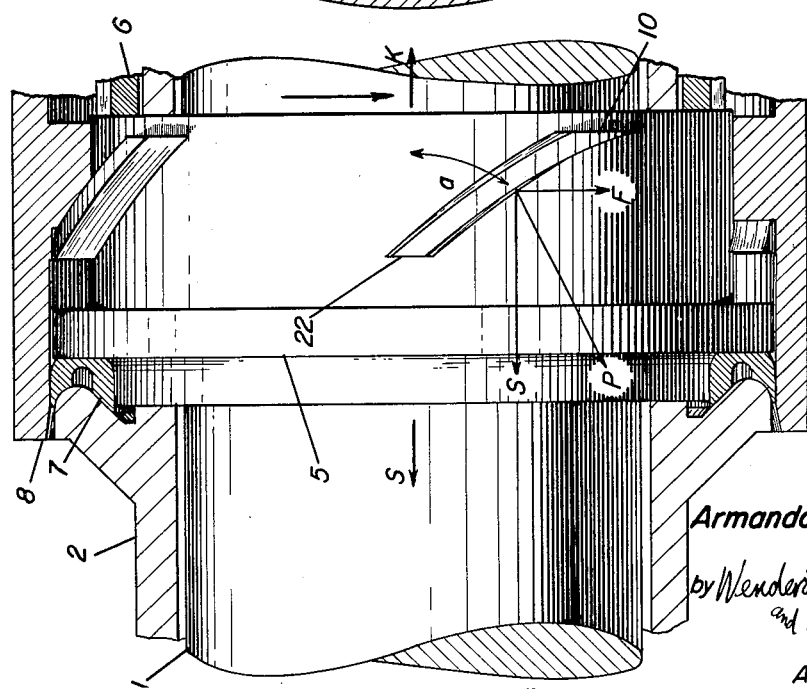
FIGURE 2 is a longitudinal view of a bushing forming part of the mechanical seal, and showing the bushing in place in the inner end of the rotating sealing member associated with the bushing.

Said load which is the load which would couple the sealing surfaces in the absence of the mechanical balancing of the rotating seal, is indicated in FIG. 2 as a force K applied to the rotating sealing element and is determined by the action of two axial forces both applied to the rotating element 8 and acting in the sense so as to couple the sealing surface 8' and 9' with each other. These axial forces are constituted by the elastic reaction of the spring 12 and by the axial resultant of the thrusts exerted by the pressure of the liquid present in the stuffing box on the surface of the rotating sealing element. Hence, during operation, between the sealing surfaces 8' and 9' a coupling load is generated which will be indicated by X, and the value of which is the difference between the value of K and that of S. S represents only the balancing factor and is characterized by the fact that it is variable and a function of the value of the frictional resistance between the sealing surfaces.

The rotation of the sealing rotating element 8 is caused by the tangential component F which therefore must have a value sufficient to balance all the resistances which oppose the rotation of the said element. Consequently, the value of the said tangential component F depends on the value of the frictional resistance generated between the sealing surfaces 8' and 9' under the action of the coupling load X as above defined. Said frictional resistance depends on, in addition to the load X, also the value of the frictional coefficient and this, in turn, depends on the nature of the surfaces coupled and on the degree of lubrication thereof, and has a minimum value when the lubrication is efficient and a maximum value in the absence of lubrication. During operation, the value of the frictional resistance is variable and the tangential component F varies therewith. Hence also the balancing factor S is variable since it is proportional to the said tangential component with a proportionality coefficient which is represented by the value of the tangent of the angle of inclination of the helical teeth 10 and 11 to the rotation axis.

From this it appears that the coupling load X between the sealing surfaces 8' and 9' existing during operation is characterized by the following features deriving from the mechanical balancing of the rotating sealing element 8:

(1) It is less than and proportional to the coupling load which would exist in the absence of the said balancing;

(2) It is not constant, but varies as a function of the friction coefficient;

(3) It decreases upon an increase of the friction coefficient and vice versa.

The mechanical balancing of the rotating sealing element is advantageous since it permits the mechanical sealing to adjust during operation the value of the coupling load between surfaces 8' and 9' as a function of the friction coefficient and hence as a function of the frictional resistance between the said surfaces.

The life and the efficiency of a mechanical seal depend on the value of the said coupling load which must be such as to ensure the sealing and at the same time the lubrication of the sealing surfaces, permitting the fluid present in the stuffing box to form a lubricating film between said surfaces. Under these conditions the friction coefficient between the sealing surfaces assumes a minimum value and the wear of the surfaces is in practice negligible. On the contrary, should the coupling load not be such as to permit the formation of the lubricating film between the sealing surfaces, these would scrape on each other without lubrication. Under these conditions the friction coefficient assumes a greater value and the wear of the sealing surface is faster.

If it is true that while planning a sealing device there may be defined the most suitable value of the coupling load, taking into account, as the case may be the functional features of the mechanical seal such for example the nature of the fluid, the pressure and temperature thereof etc., it is also true that, during the operation of the mechanical seal, such particular conditions may occur which alter the value of the coupling load, and/or make worse the conditions of lubrication. For example, during the operation there may occur:

(a) an abnormal shaft end-play;
(b) an abnormal shaft run-out;
(c) insufficient cooling of the sealing surfaces;
(d) loss of suction by the pump, particularly when the pump sucks volatile liquids under particular sucking conditions.

Further, it must be remembered that in the event that during the assembling the dimensions are not strictly adhered to the tension of the spring changes and the coupling load established by the planner changes therewith.

The main advantage of the mechanical balancing of the sealing rotating element is that it makes for a greater adaptability of the mechanical seal during operation. As a matter of fact, as soon as the frictional resistance between the sealing surfaces tends to increase due to a greater value of the friction coefficient due to lubrication conditions becoming worse or to a greater value of the coupling load or to both things, under the effect of the mechanical balancing of the rotating sealing element an automatic decrease of the coupling load between the sealing surfaces takes place, which promotes restoring of the normal conditions. On the contrary, with a decrease of the frictional resistance due to a decrease of the coupling load, the mechanical seal reacts so as to increase the said load between the sealing surfaces.

A further advantage of the invention lies in the fact that the seal between the rotating sealing element 8 and the sleeve 2 is performed by two separate sealing rings; the inner one 7 is provided to produce the main seal at the end of the rotating element opposite to that having the sealing surface 8' thereon, while the outer one 13 is provided to ensure an additional seal on the end of the element 8 which has the sealing surface 8' thereon. In this manner the cavity enclosed between the inner surface of the rotating sealing element 8 and the outer surface of the sleeve 2 is liquid tight at both ends. In said cavity there are located all the elements of the mechanical seal which provide the control and the balancing of the rotating sealing element, namely the drive bushing 5, the helical teeth 10, the helical teeth 11, as well as the threaded locking nut 6 and the spring 12. This arrangement is advantageous, since all these elements are protected from the action of the fluid in the event of a slight leak through the sealing surfaces 8' and 9'.

What is claimed is:

1. In a rotating mechanical seal for the stuffing box of rotating machines having a stationary casing and a rotating shaft inside the said casing, said seal having an outer body through which the said shaft passes, said outer body being fastened to the stationary casing, a rotating sealing element having a sealing surface perpendicular to the axis of rotation, and a stationary sealing element connected to the said outer body and having a sealing surface abutting against the said rotating sealing element, that improvement comprising means for coupling said rotating sealing element to the shaft comprising a sleeve mounted on the said shaft and rotating therewith, said sleeve having a shoulder at one end of its outer surface, a drive bushing keyed on the said sleeve near the said shoulder, a rotating cylinder mounted on the said sleeve and on the said drive bushing and defining between it and the outer surface of the said sleeve an annular cavity, elastic sealing means at the two ends of the said annular cavity for closing said cavity tightly and preventing the liquid contained in the said outer body from entering the said cavity, said rotating sealing element being on said cylinder at the other end from said shoulder, a spiral spring mounted on the said sleeve inside the said annular cavity, said spiral spring being compressed between said drive bushing and said rotating sealing element to press the sealing surface of the said rotating sealing element against the said stationary sealing surface, said drive bushing having on its outer surface a first set of helical teeth inclined with respect to the axis of rotation, the inner surface of the said rotating cylinder having a second set of helical teeth having an inclination equal to the inclination of the said first set of teeth and against which the teeth of the said first toothing abut to transmit the rotation from the said drive bushing to the said rotating sealing element, whereby the rotation of the drive bushing is transmitted to the said sealing rotating element through the said first and second toothing and said cylinder by a force acting on the flanks of the said second toothing, said force having a tangential and an axial component, said axial component being proportional to the said tangential component depending on the tangent of the angle of inclination angle of the teeth, the direction of said inclination being such that said axial component acts in a direction opposite to the direction in which said rotating sealing surface is coupled with said stationary sealing surface, said axial component thus being a balancing factor, the value of which is variable and a function of the frictional resistance between the said rotating sealing surface and said stationary sealing surface, which balancing factor affects the value of the coupling load between said rotating sealing surface and said stationary sealing surface during the operation of the mechanical rotating seal.

2. The improvement as claimed in claim 1, wherein said drive bushing has a projection thereon with a curved surface, said curved surface forming a recess facing the said shoulder, and said elastic sealing means comprising a shaped sealing ring inserted between said curved surface and said shoulder to ensure the sealing at one end of the said circular cavity, a threaded nut threaded on the said sleeve and adjacent to the said drive bushing to keep said shaped sealing ring pressed between said shoulder and said drive bushing, said rotating cylinder having at its end opposite to the said shoulder and on the inner surface thereof two projections directed toward the said sleeve, said projections delimiting between each other a circular recess, and said elastic sealing means further comprising a ring made of an elastic material and having a circular cross section positioned in the said circular recess to ensure the tight sealing of the said cavity at the other end thereof.

3. In a rotating mechanical seal for insuring a seal between a casing and a shaft passing through the casing, the casing having a stationary seal thereon and a rotating sealing element on said shaft, that improvement comprising a sleeve mounted on the shaft and rotating therewith, said sleeve having a shoulder on one end, a drive bushing keyed on the sleeve near the said shoulder, spring means between said drive bushing and said sealing element urging sealing element toward and into sealing contact with said stationary seal, and driving means rotating said rotating sealing element in the opposite direction from the direction of rotation of said shaft and longitudinally away from said stationary seal against the action of said spring means, said driving means comprising a first set of helical teeth provided on the outer surface of said drive bushing, a second set of helical teeth provided on the inner surface of said rotating element on the end thereof opposite to that engaging the stationary seal, said teeth being inclined to rotate the said sealing element in a direction opposite to the direction of rotation of said shaft and move it transversely in a direction away from said stationary seal.

References Cited in the file of this patent

UNITED STATES PATENTS

| | | |
|---|---|---|
| 2,182,072 | Czarnecki | Dec. 5, 1939 |
| 2,556,393 | Holben | June 12, 1951 |
| 2,595,926 | Chambers | May 6, 1952 |
| 2,797,940 | Michener et al. | July 2, 1957 |
| 2,824,759 | Tracy | Feb. 25, 1958 |